US012593300B2

(12) United States Patent
Miyake et al.

(10) Patent No.: US 12,593,300 B2
(45) Date of Patent: Mar. 31, 2026

(54) POSITION ESTIMATION SYSTEM AND MOBILE STATION

(71) Applicant: JVCKENWOOD Corporation, Yokohama (JP)

(72) Inventors: Fumiaki Miyake, Yokohama (JP); Kiyoshi Hosoya, Yokohama (JP); Satoru Nakae, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 396 days.

(21) Appl. No.: 18/196,515

(22) Filed: May 12, 2023

(65) Prior Publication Data

US 2023/0284175 A1 Sep. 7, 2023

Related U.S. Application Data

(63) Continuation of application No. PCT/JP2021/027557, filed on Jul. 26, 2021.

(30) Foreign Application Priority Data

Dec. 18, 2020 (JP) ................................. 2020-210295

(51) Int. Cl.
$H04W\ 64/00$ (2009.01)
$G01S\ 5/00$ (2006.01)
$G01S\ 5/02$ (2010.01)

(52) U.S. Cl.
CPC ........... $H04W\ 64/00$ (2013.01); $G01S\ 5/0036$ (2013.01); $G01S\ 5/0221$ (2013.01); $G01S\ 2205/02$ (2020.05)

(58) Field of Classification Search
CPC ..... H04W 64/00; H04W 88/06; H04W 48/18; G01S 5/00; G01S 5/02; G01S 5/0036; G01S 5/0221; G01S 2205/02; G01S 11/06
(Continued)

(56) References Cited

U.S. PATENT DOCUMENTS 8,044,859 B2 * 10/2011 Lommen ............... G01S 5/0246
342/465
9,538,332 B1 * 1/2017 Mendelson ........... H04W 48/10
(Continued)

FOREIGN PATENT DOCUMENTS

JP 2017526904 A 9/2017
JP 2018036246 A 3/2018
(Continued)

OTHER PUBLICATIONS

International Search Report and Written Opinion of PCT/JP2021/ 027557 dated Oct. 12, 2021.

*Primary Examiner* — Jean A Gelin
(74) *Attorney, Agent, or Firm* — PROCOPIO, CORY, HARGREAVES & SAVITCH LLP

(57) ABSTRACT

A position estimation system includes a beacon transmitter that transmits a beacon signal, a mobile station that receives the beacon signal from the beacon transmitter and transmits positioning data including ID information of the received beacon signal, and a position information server that estimates a position of the mobile station based on the positioning data transmitted from the mobile station, in which the mobile station includes a plurality of transmission means, and switches the transmission means for transmitting the positioning data based on the received beacon signal.

3 Claims, 7 Drawing Sheets

1

(58) Field of Classification Search
USPC ...................................................... 455/456.1
See application file for complete search history.

(56)                    References Cited

U.S. PATENT DOCUMENTS

| | | | |
|---|---|---|---|
| 2010/0260156 A1* | 10/2010 | Lee ................... | H04W 56/0035 |
| | | | 370/336 |
| 2014/0253383 A1* | 9/2014 | Rowitch .............. | G01S 5/0236 |
| | | | 342/386 |
| 2016/0003949 A1* | 1/2016 | Venkataraman ........ | G01S 19/24 |
| | | | 342/357.29 |
| 2016/0227370 A1* | 8/2016 | Gunnarsson .............. | G01S 5/14 |
| 2017/0188326 A1* | 6/2017 | Jeon .......................... | G01S 5/14 |
| 2017/0201865 A1* | 7/2017 | Cho ...................... | H04W 4/026 |
| 2018/0088339 A1* | 3/2018 | Aruga .................... | G01S 19/53 |
| 2018/0249086 A1* | 8/2018 | Ozawa ................ | G05D 1/0038 |
| 2019/0297592 A1* | 9/2019 | Lindquist .............. | G01S 5/0236 |
| 2021/0049865 A1* | 2/2021 | Burns ..................... | G01S 19/46 |
| 2021/0081735 A1* | 3/2021 | Van Dijk ............. | G01S 5/0289 |
| 2022/0337974 A1* | 10/2022 | Ochiai .................... | G01S 5/015 |
| 2023/0160859 A1* | 5/2023 | Kubo ..................... | G06F 16/90 |
| | | | 702/56 |

FOREIGN PATENT DOCUMENTS

| | | | |
|---|---|---|---|
| JP | 2020134152 A | 8/2020 | |
| WO | 2016018512 A1 | 2/2015 | |

* cited by examiner

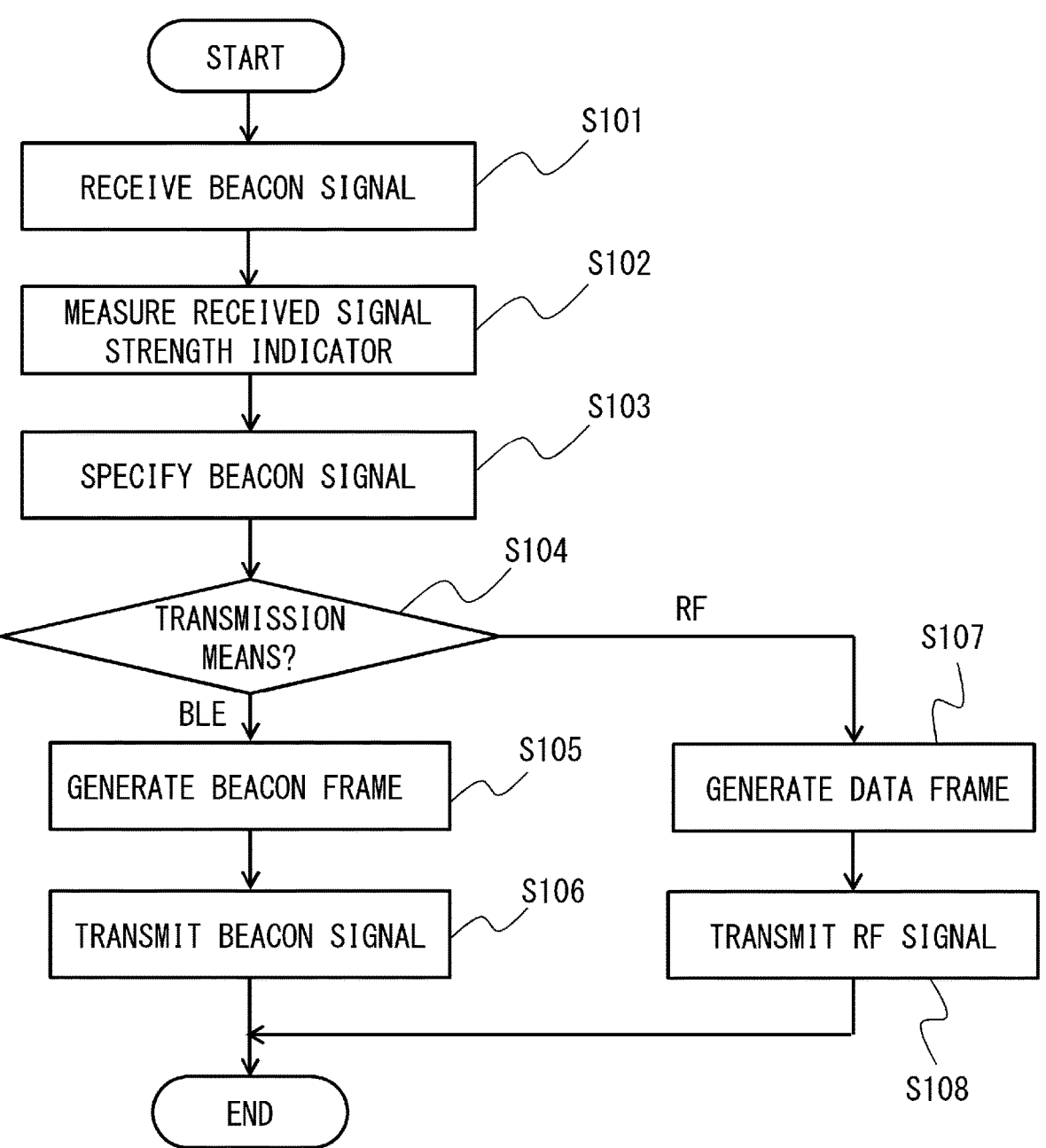
F i g. 5

TRANSMISSION SELECTION TABLE

| UUID | TRANSMISSION MEANS | TRANSMISSION DESTINATION |
|------|--------------------|--------------------------|
| 00010001 | BLE | BLE GATEWAY |
| 00010002 | RF | BASE STATION |

START

RECEIVE POSITIONING DATA          S201

ACQUIRE ID INFORMATION AND RECEIVED SIGNAL STRENGTH INDICATOR OF BEACON SIGNAL          S202

ESTIMATE POSITION          S203

END

POSITION ESTIMATION SYSTEM AND MOBILE STATION

CROSS REFERENCE TO RELATED APPLICATION

This application is based upon and claims the benefit of priority from Japanese patent application No. 2020-210295, filed on Dec. 18, 2020, and International application No. PCT/JP2021/027557, filed on Jul. 26, 2021, the disclosure of which is incorporated herein in its entirety by reference.

BACKGROUND

The present invention relates to a position estimation system and a mobile station.

In recent years, a use of a position estimation system that estimates a position of electronic equipment has spread. As the position estimation system, there has been implemented, in addition to a system that calculates information about an outdoor position using a GPS (global positioning system) signal of a GPS satellite, systems using beacon signals, such as Bluetooth (registered trademark) and a wireless LAN (local area network), to obtain information about an indoor position where a GPS signal cannot be received.

As a related technique, Japanese Unexamined Patent Application Publication No. 2020-134152, for example, has been known. Japanese Unexamined Patent Application Publication No. 2020-134152 describes a technique for performing positioning processing by indoor positioning using a beacon signal or outdoor positioning using a GPS signal depending on whether a portable terminal exists indoors or outdoors.

SUMMARY

In the related technique as described in Japanese Unexamined Patent Application Publication No. 2020-134152, the beacon signal is used in indoor position estimation, and the GPS signal is used in outdoor position estimation. However, even when the GPS signal is used outdoors, a dead area occurs in an environment in a tunnel or with a roof. Therefore, a position may be unable to be estimated. An attempt to always use short-range radio such as Bluetooth makes it impossible to obtain necessary information depending on an environment. Therefore, a position may be unable to be estimated. Accordingly, in the related technique, there is a problem that a position is difficult to be more reliably estimated.

The present embodiment provides a position estimation system including a beacon transmitter that transmits a beacon signal, a mobile station that receives the beacon signal from the beacon transmitter and transmits positioning data including ID information of the received beacon signal, and a position estimation apparatus that estimates a position of the mobile station based on the positioning data transmitted from the mobile station, in which the mobile station includes a plurality of transmission means, and switches the transmission means for transmitting the positioning data based on the received beacon signal.

The present embodiment provides a mobile station including a receiving unit that receives a beacon signal from a beacon transmitter, a first transmission unit that wirelessly transmits positioning data including ID information of the received beacon signal using a first communication system, a second transmission unit that wirelessly transmits the positioning data using a second communication system, and a control unit that switches a transmission unit that transmits the positioning data to either the first transmission unit or the second transmission unit based on the received beacon signal.

BRIEF DESCRIPTION OF THE DRAWINGS

FIG. 5 is a flowchart illustrating an operation example of the mobile station according to the first embodiment;

DETAILED DESCRIPTION

Figure 1:
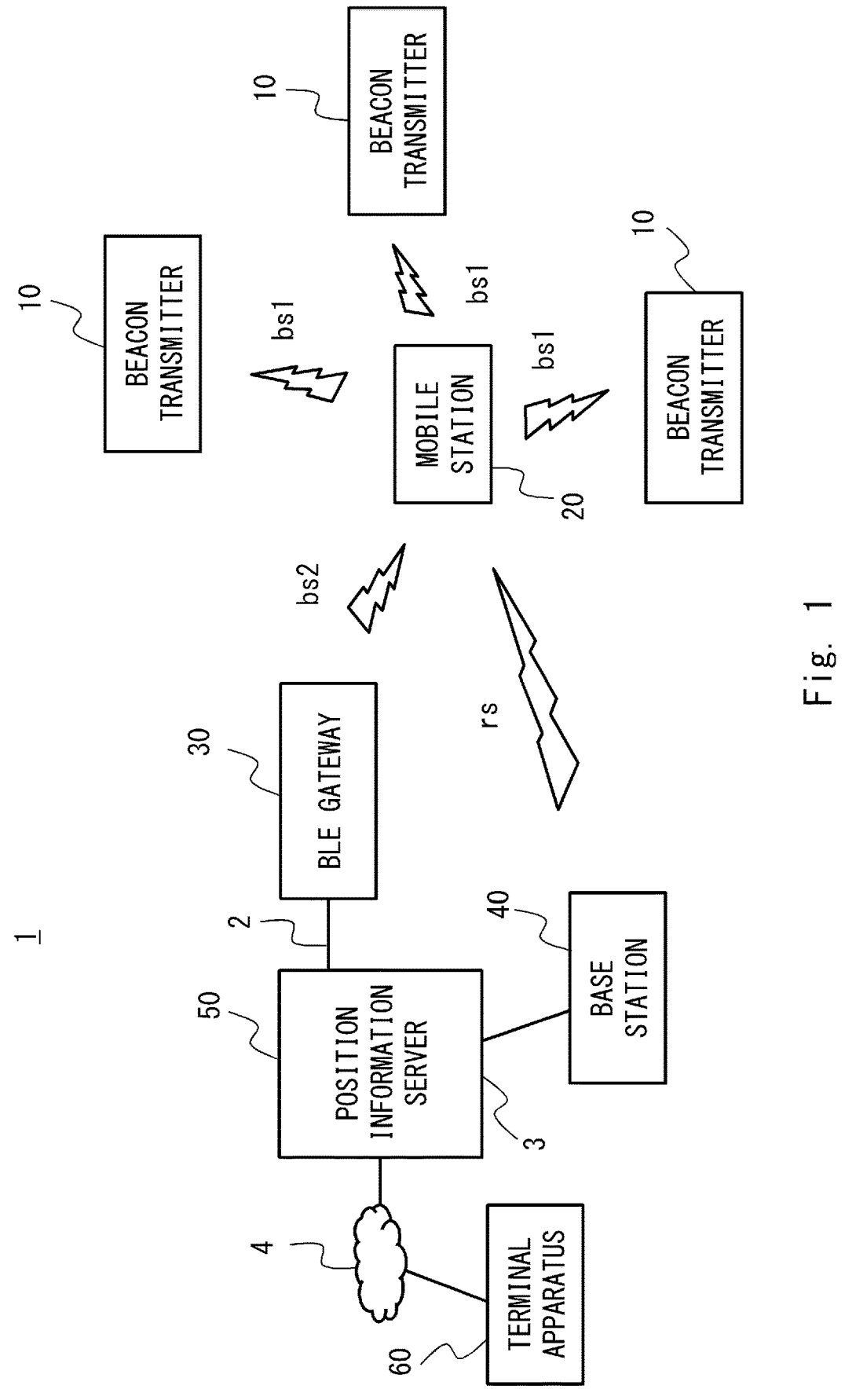
FIG. 1 is a configuration diagram illustrating a configuration example of a position estimation system according to a first embodiment.

Embodiments will be described below with reference to the drawings. In each of the drawings, the same elements are respectively assigned the same reference numerals, and repeating description is omitted, as needed.

First Embodiment

A first embodiment will be described below with reference to the drawings. FIG. 1 illustrates a configuration example of a position estimation system according to the present embodiment. As illustrated in FIG. 1, a position estimation system 1 according to the present embodiment includes a plurality of beacon transmitters 10, a mobile station 20, a BLE gateway 30, a base station 40, a position information server 50, and a terminal apparatus 60.

The position estimation system 1 is a system that measures a position of the mobile station 20 using a beacon signal bs (herein referred to as bs1) to be transmitted by each of the beacon transmitters 10 and received by the mobile station 20. Examples of the beacon signal bs include iBeacon (registered trademark) using Bluetooth Low Energy (BLE).

The mobile station 20 transmits a beacon signal bs (herein referred to as bs2), like the beacon transmitter 10, and transmits an RF signal rs to be used in business radio, for example. For example, the beacon signal bs is a short-range radio signal having a frequency of 2.4 GHz to be used in Bluetooth, and is communicable in a range of several meters to approximately 100 meters. The RF signal rs is a long-range radio signal having a frequency of 100 MHz to 900 MHz in UHF or VHF to be used in business radio, and is communicable in a range of several kilometers to several ten kilometers. The beacon signal bs is not limited to Bluetooth but may be another short-range radio signal such as a wireless LAN. The RF signal rs is not limited to business radio but may be another long-range radio signal such as a mobile phone.

The beacon transmitters 10 are installed indoors or outdoors. For example, the beacon transmitters 10 are installed in a range where position estimation is possible using the beacon signals bs and at spacings of several meters to 100 meters. The mobile station 20 moves in an area around the beacon transmitters 10 installed indoors or outdoors, and the position information server 50 estimates the position of the mobile station 20 located indoors or outdoors.

It can also be said that the beacon transmitters 10, the mobile station 20, and the BLE gateway 30 constitute a BLE wireless communication system capable of performing wireless communication using a BLE signal. For example, a BLE sensor that relays the BLE signal (the beacon signal bs2) may be provided between the BLE gateway 30 and the mobile station 20. It can also be said that the mobile station 20 and the base station 40 constitute a business wireless communication system capable of performing wireless communication using the RF signal to be used in business radio. For example, a repeater that relays the RF signal rs may be provided between the base station 40 and the mobile station 20.

Figure 2A:
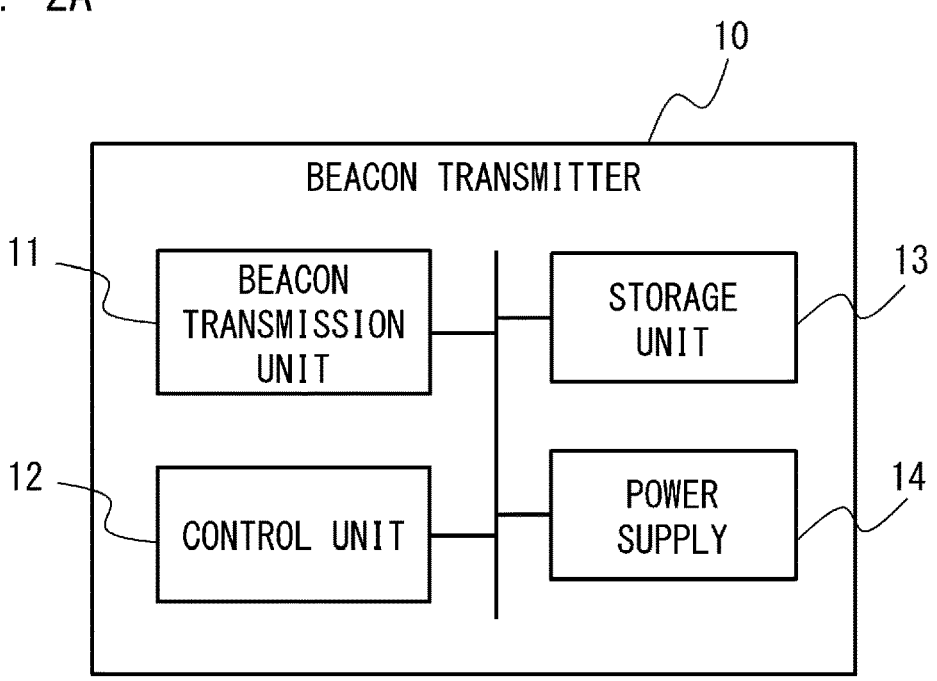
FIG. 2A is a configuration diagram illustrating a configuration example of a beacon transmitter according to the first embodiment.

Each of the beacon transmitters 10 is a transmitter that transmits a beacon signal bs1 for position measurement. FIG. 2A illustrates a configuration example of the beacon transmitter 10 according to the present embodiment. As illustrated in FIG. 2A, the beacon transmitter 10 includes a beacon transmission unit 11, a control unit 12, a storage unit 13, and a power supply 14, for example. The beacon transmission unit 11 wirelessly transmits the beacon signal bs1 according to a communication standard such as BLE. The beacon transmission unit 11 broadcasts a beacon signal bs1 including ID information (UUID: universally unique identifier) for identifying the beacon transmitter 10 as a transmission source to the periphery periodically (e.g., every 100 milliseconds).

The control unit 12 is a control unit that controls each of the units in the beacon transmitter 10. The control unit 12 controls generation of a beacon frame to be transmitted as the beacon signal bs1 and transmission timing, transmission power, and the like of the beacon signal bs1. The storage unit 13 is a storage unit that stores information required for an operation of the beacon transmitter 10. The storage unit 13 stores the ID information for identifying the beacon transmitter 10 or the like, included in the beacon signal bs1.

Examples of the power supply 14 include a battery power supply for the beacon transmitter 10 to operate. The power supply may be contained in the beacon transmitter 10, or may be supplied from outside. The beacon transmitter 10 may include a geomagnetic sensor that detects a direction of the beacon transmitter 10, a GPS receiving unit that receives a GPS signal, a display unit that displays information to a user, and the like, as needed, in addition thereto.

The mobile station 20 is a receiver that receives the beacon signal bs1 transmitted from the beacon transmitter 10 and is equipment as a position measurement target. In this example, the mobile station 20 is a transceiver that performs business wireless communication with the base station 40 using the RF signal rs. For example, the mobile station 20 is a mobile and portable radio capable of performing voice calls and data communication using the RF signal rs.

The mobile station 20 is equipment that outputs positioning data based on the received beacon signal bs1 to perform position measurement. In this example, the mobile station 20 transmits the positioning data based on the received beacon signal bs1 to the BLE gateway 30 using the beacon signal bs2 (the BLE signal) or to the base station 40 using the RF signal rs. It can also be said that the beacon signal bs1 to be received and the beacon signal bs2 to be transmitted are respectively beacon signals using the same communication system such as BLE and the mobile station 20 is a transceiver that transmits and receives the beacon signals.

Figure 2B:
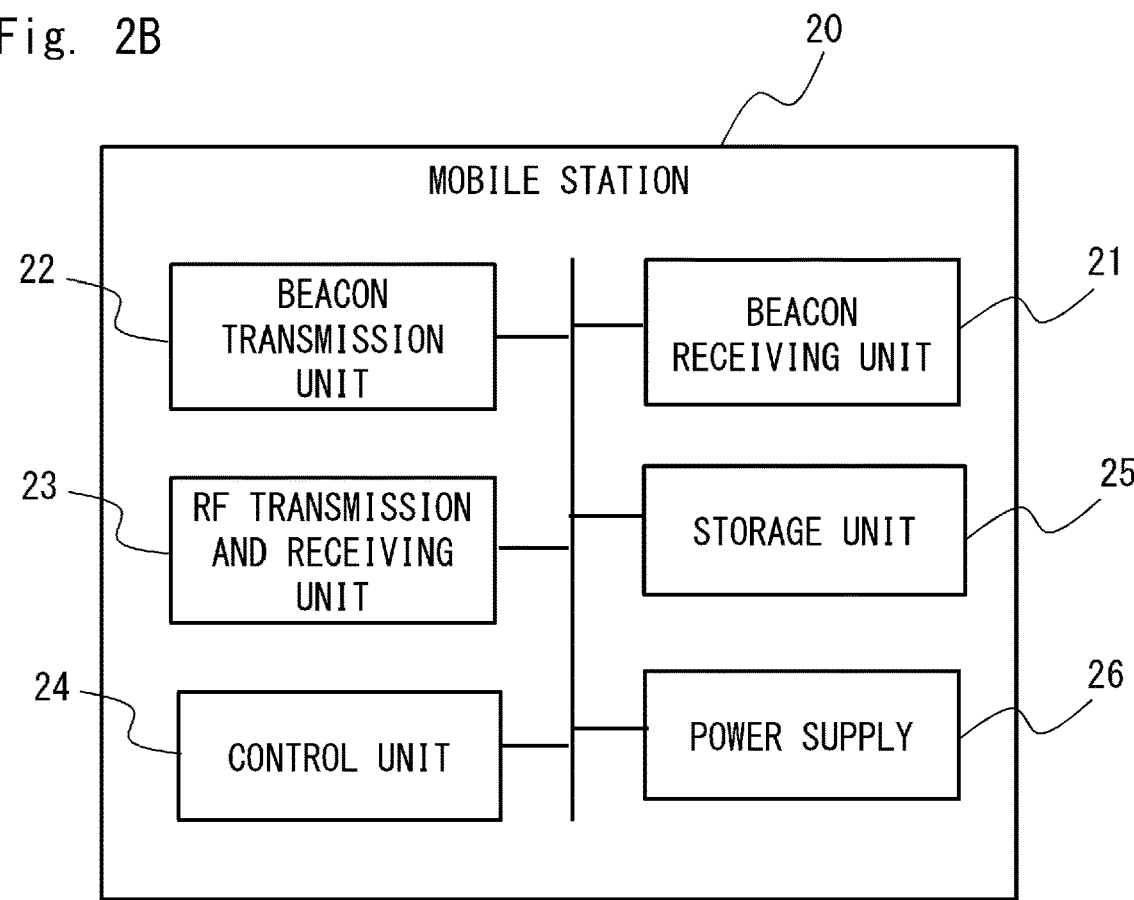
FIG. 2B is a configuration diagram illustrating a configuration example of a mobile station according to the first embodiment.

FIG. 2B illustrates a configuration example of the mobile station 20 according to the present embodiment. As illustrated in FIG. 2B, the mobile station 20 includes, for example, a beacon receiving unit 21, a beacon transmission unit 22, an RF transmission and receiving unit 23, a control unit 24, a storage unit 25, and a power supply 26. The mobile station 20 may have another configuration if it can perform an operation described below.

The beacon receiving unit 21 receives a beacon signal bs1 wirelessly transmitted from the beacon transmitter 10 according to the communication standard such as BLE and further measures a received signal strength indicator (RSSI) of the received beacon signal bs1. The beacon transmission unit 22 wirelessly transmits a beacon signal bs2 according to the communication standard such as BLE. The beacon transmission unit 22 transmits a beacon signal bs2 including positioning data based on the received beacon signal bs1 and ID information for identifying the mobile station 20.

The RF transmission and receiving unit 23 transmits and receives an RF signal rs to and from the base station 40 according to a business wireless communication standard such as DMR (digital mobile radio). The RF transmission and receiving unit 23 transmits and receives voice and data to and from the base station 40 using an RF signal rs on a set channel. The RF transmission and receiving unit 23 transmits an RF signal rs including the positioning data based on the received beacon signal bs1 and the ID information for identifying the mobile station 20. A channel on which positioning data is transmitted may be a voice channel or may be a data channel. For example, the RF transmission and receiving unit 23 is first transmission means (a first transmission unit) that transmits positioning data using a first communication system, and the beacon receiving unit 21 is second transmission means (a second transmission unit) that transmits positioning data using a second transmission system having a shorter communicable distance than that of the first communication system.

The control unit 24 is a control unit that controls each of the units in the mobile station 20. The control unit 24 is a generation unit that generates positioning data from the received beacon signal bs1. The positioning data is data for measuring a position of the mobile station 20, and includes ID information for identifying the beacon transmitter 10 included in the received beacon signal bs1 and a received signal strength indicator of the beacon signal bs1. The positioning data may include only at least the ID information of the beacon signal bs1. The control unit 24 generates positioning data from a beacon signal bs1 having the highest received signal strength indicator among a plurality of beacon signals bs1 received in a predetermined period (e.g., every two seconds). The control unit 24 is a switching unit that refers to a transmission selection table in the storage unit 25 and switches transmission means for transmitting the positioning data of the beacon signal bs1 based on the received beacon signal bs1. Specifically, the control unit 24 switches the transmission means for transmitting the positioning data to either the beacon transmission unit 22 (BLE) or the RF transmission and receiving unit 23 (RF) based on the ID information of the beacon signal bs1. Further, the control unit 24 switches a transmission destination to which the positioning data is to be transmitted to either the BLE gateway 30 or the base station 40 based on the ID information of the beacon signal bs1. It can also be said that the control unit 24 is a determination unit (selection unit) that determines (selects) a transmission path including the transmission means for transmitting the positioning data and the transmission destination. Although both the transmission means and the transmission destination are switched in this example, either one of them may be switched.

For example, the BLE is suitable for indoor positioning, and the RF is suitable for outdoor positioning. Accordingly, it may be determined whether the beacon transmitter 10 as a transmission source of the beacon signal bs1 is a beacon transmitter 10 installed indoors or a beacon transmitter 10 installed outdoors from the ID information of the beacon signal bs1, to respectively select the BLE and the RF when the beacon transmitter 10 is the indoor beacon transmitter 10 and the outdoor beacon transmitter 10. For example, the mobile station 20 may include a GPS receiver, and it may be determined whether the beacon transmitter 10 is located indoors or outdoors from a position to be detected by the GPS receiver, to select the transmission means based on a determination result. The BLE has a feature of being short in communication distance, high in communication speed, and low in power consumption, and the RF has a feature of being long in communication distance, low in communication speed, and high in power consumption. Accordingly, the transmission means may be set to the BLE if a distance to the BLE gateway 30 is shorter than a predetermined distance (e.g., if a radio wave from the BLE gateway 30 can be received), if a position needs to be measured in a short time period (e.g., if the transmission means is used for emergency purposes), or if the power consumption of the mobile station is desired to be suppressed (e.g., if the remaining amount of the power supply is smaller than a predetermined amount), for example. The transmission means may be set to the RF if the distance to the BLE gateway 30 is longer than the predetermined distance (e.g., if the radio wave from the BLE gateway 30 cannot be received), if the position needs not to be measured in a short time period (e.g., if the transmission means is used for purposes not requiring urgency), or if the power consumption of the mobile station need not to be suppressed (e.g., if the remaining amount of the power supply is larger than the predetermined amount), for example. The transmission means having the better communication quality out of the BLE (the beacon transmission unit 22) and the RF (the RF transmission and receiving unit 23) may be selected.

The storage unit 25 is a storage unit that stores information required for an operation of the mobile station 20. The storage unit 25 stores the ID information for identifying the mobile station 20, for example, included in the beacon signal bs2 to be transmitted and the RF signal rs. The storage unit 25 stores the transmission selection table for selecting the transmission means for transmitting the positioning data and the transmission destination. For example, a PC (personal computer) in which a dedicated setting tool is installed may be connected to the mobile station 20, as needed, thereby making it possible to perform various types of setting of the transmission selection table or the like from the setting tool in the PC.

The power supply 26 is a power supply for the mobile station 20 to operate. The power supply 26 may be contained in the mobile station 20, or may be supplied from outside. The mobile station 20 may include a receiving unit that receives a GPS signal, an operation unit to be operated by a user, a microphone and a speaker with which the user makes calls, a display unit that displays information to the user, and the like, as needed, in addition thereto.

The BLE gateway 30 is a receiving apparatus that receives the beacon signal bs2 transmitted from the mobile station 20 and is equipment that relays the positioning data included in the beacon signal bs2 to be received to the position information server 50. For example, the BLE gateway 30 may be connected to the position information server 50 via any communication line or network, although connected thereto via a serial line 2.

Figures 3A, 3B:
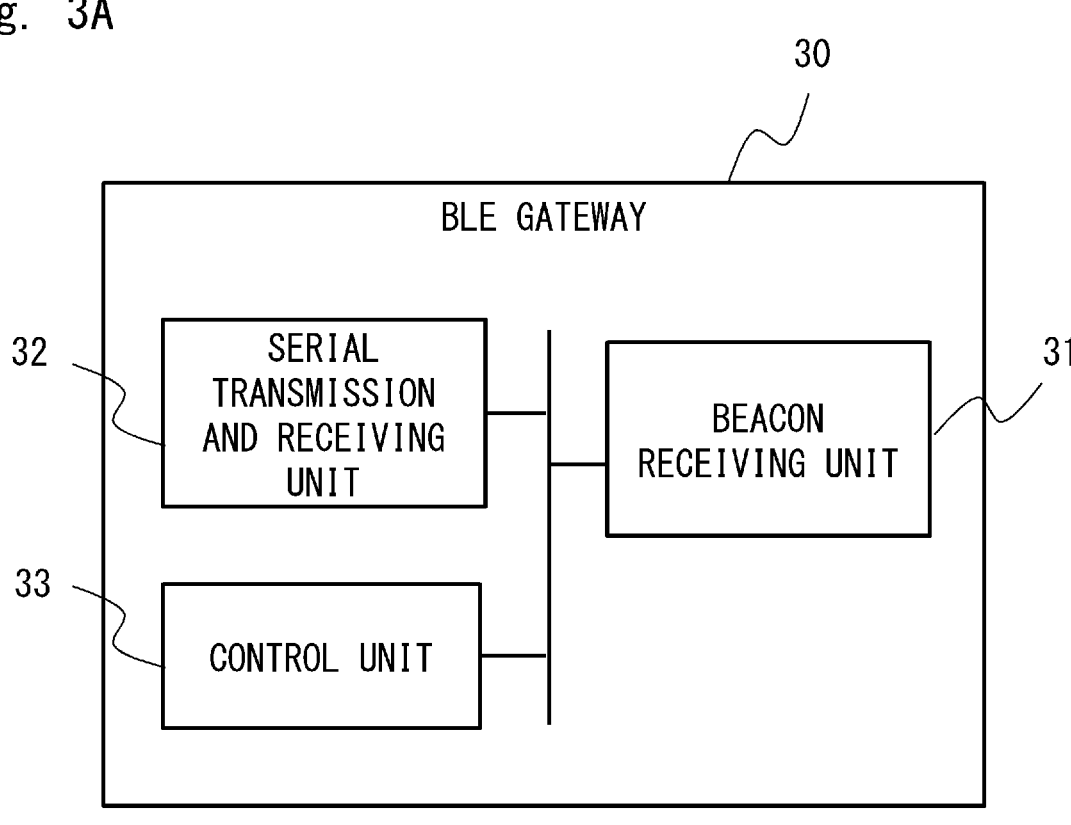
FIG. 3A is a configuration diagram illustrating a configuration example of a BLE gateway according to the first embodiment.
FIG. 3B is a configuration diagram illustrating a configuration example of a base station according to the first embodiment.

FIG. 3A illustrates a configuration example of the BLE gateway 30 according to the present embodiment. As illustrated in FIG. 3A, the BLE gateway 30 includes a beacon receiving unit 31, a serial transmission and receiving unit 32, and a control unit 33, for example. The beacon receiving unit 31 receives a beacon signal bs2, including ID information and positioning data, which has been wirelessly transmitted from the mobile station 20 according to the communication standard such as BLE.

The serial transmission and receiving unit 32 communicates with the position information server 50 via the serial line 2 according to a serial communication standard. The serial transmission and receiving unit 32 transmits ID information for identifying the mobile station 20 and positioning data based on a beacon signal bs1, which have been received from the mobile station 20, to the position information server 50. The control unit 33 is a control unit that controls each of the units in the BLE gateway 30. The control unit 33 transfers the information included in the received beacon signal bs2 to the serial transmission and receiving unit 32.

The base station 40 is a receiving apparatus that receives an RF signal rs transmitted from the mobile station 20 and is equipment that relays positioning data included in the RF signal rs to be received to the position information server 50. In this example, the base station 40 is a fixed system radio machine that performs business wireless communication with a plurality of mobile stations 20 using the RF signal rs. For example, the base station 40 may be connected to the position information server 50 via any communication line or network, although connected thereto via a serial line 3. For example, the base station 40 is a first receiving apparatus that receives positioning data using a first communication system, and the BLE gateway 30 is a second receiving apparatus that receives positioning data using a second communication system.

FIG. 3B illustrates a configuration example of the base station 40 according to the present embodiment. As illustrated in FIG. 3B, the base station 40 includes an RF transmission and receiving unit 41, a serial transmission and receiving unit 42, and a control unit 43, for example. The RF transmission and receiving unit 41 transmits and receives an RF signal rs to and from the mobile station 20 according to the business wireless communication standard such as DMR. The RF transmission and receiving unit 41 transmits and receives voice and data to and from the mobile station 20 using an RF signal rs on a set channel. The RF transmission and receiving unit 41 receives an RF signal rs, including ID information and positioning data, which has been transmitted from the mobile station 20.

The serial transmission and receiving unit 42 communicates with the position information server 50 via the serial line 3 according to a serial communication standard. The serial transmission and receiving unit 42 transmits ID information for identifying the mobile station 20 and positioning data based on a beacon signal bs1, which have been received from the mobile station 20, to the position information server 50. The control unit 43 is a control unit that controls each of the units in the base station 40. The control unit 43 transfers the information included in the received RF signal rs to the serial transmission and receiving unit 42. The base station 40 may include an operation unit to be operated by the user, a microphone and a speaker with which the user makes calls, a display unit that displays information to the user, and the like, as needed, in addition thereto.

Figure 4A:
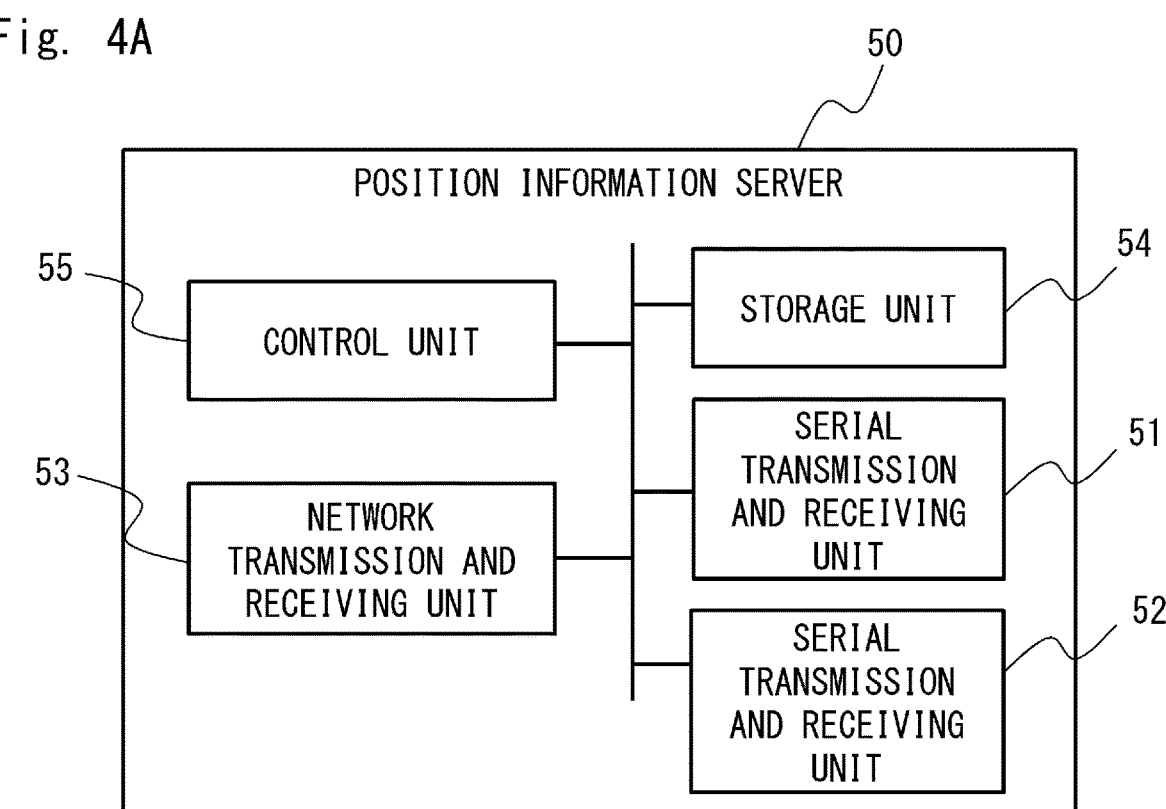
FIG. 4A is a configuration diagram illustrating a configuration example of a position information server according to the first embodiment.

The position information server 50 is a position estimation apparatus that estimates a position of the mobile station 20 based on the positioning data of the beacon signal bs1 from the beacon transmitter 10. For example, the position information server 50 is connected to the terminal apparatus 60 via a network 4. The network 4 may be a LAN, a wireless LAN, the Internet, or the like, or may be a communication line such as a serial line. FIG. 4A illustrates a configuration example of the position information server 50 according to the present embodiment. As illustrated in FIG. 4A, the position information server 50 includes a serial transmission and receiving unit 51, a serial transmission and receiving unit 52, a network transmission and receiving unit 53, a storage unit 54, and a control unit 55, for example. The position information server 50 may have another configuration if it can perform an operation described below.

The serial transmission and receiving unit 51 communicates with the BLE gateway 30 via the serial line 2 according to the serial communication standard. The serial transmission and receiving unit 51 receives, from the BLE gateway 30, ID information and positioning data included in a beacon signal bs2 received from the mobile station 20 by the BLE gateway 30. The serial transmission and receiving unit 52 communicates with the base station 40 via the serial line 3 according to the serial communication standard. The serial transmission and receiving unit 52 receives, from the base station 40, ID information and positioning data included in the RF signal rs received from the mobile station 20 by the base station 40. The serial transmission and receiving unit 52 is a first receiving unit that receives the positioning data through a first path via the base station 40, and the serial transmission and receiving unit 51 is a second receiving unit that receives the positioning data through a second path via the BLE gateway 30.

The network transmission and receiving unit 53 communicates with the terminal apparatus 60 via the network 4 according to a standard such as Ethernet (registered trademark). The storage unit 54 stores information required for an operation of the position information server 50. The storage unit 54 stores map information, a position on a map of the beacon transmitter 10, calculated position information of the mobile station 20, and the like.

The control unit 55 is a control unit that controls each of the units in the position information server 50. The control unit 55 estimates the position information of the mobile station 20 based on the positioning data of the beacon signal bs1 received by the mobile station 20. The control unit 55 receives, from the BLE gateway 30 or the base station 40, positioning data including ID information and a received signal strength indicator of the beacon signal bs1 received from the beacon transmitter 10 by the mobile station 20, and estimates a position of the mobile station 20 to be identified from the ID information of the beacon signal bs2 using a position on a map of the beacon transmitter 10 and a distance to the mobile station 20 to be calculated from the received signal strength indicator. For example, the control unit 55 estimate the position of the mobile station 20 based on ID information and a received signal strength indicator of a beacon signal bs1 having the highest received signal strength indicator among beacon signals bs1 from the plurality of beacon transmitters 10.

Figure 4B:
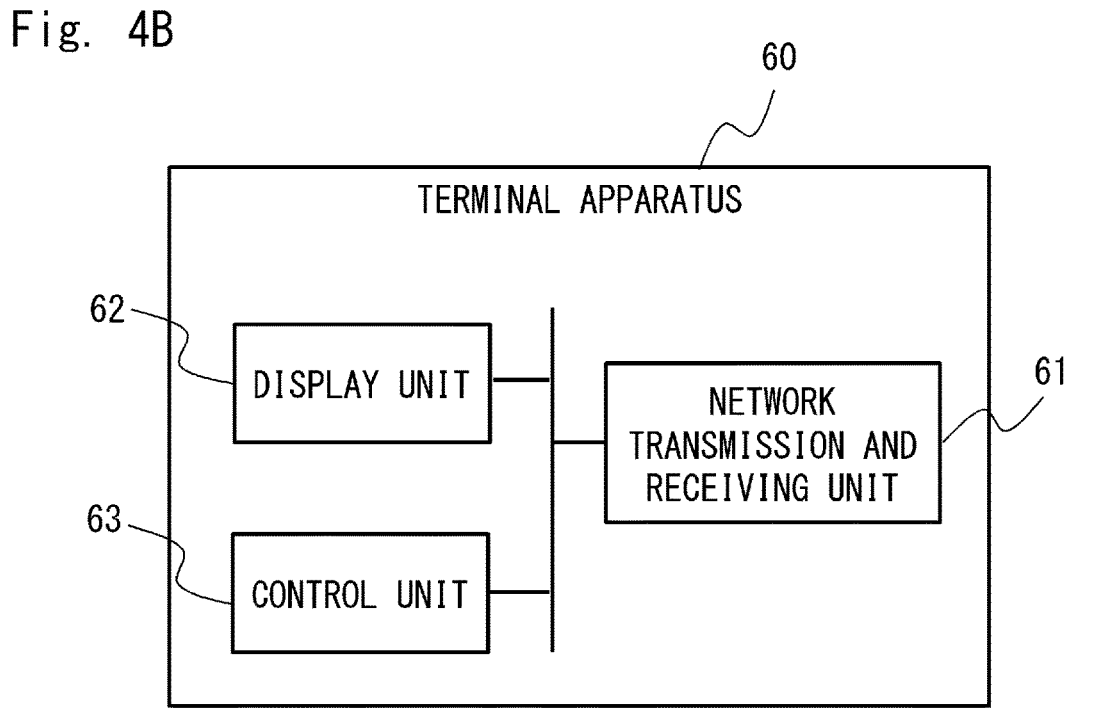
FIG. 4B is a configuration diagram illustrating a configuration example of a terminal apparatus according to the first embodiment.

The terminal apparatus 60 is a client terminal that accesses the position information server 50 and refers to the position information of the mobile station 20. The terminal apparatus 60 is any information processing apparatus such as a PC or a smartphone. FIG. 4B illustrates a configuration example of the terminal apparatus 60 according to the present embodiment.

As illustrated in FIG. 4B, the terminal apparatus 60 includes a network transmission and receiving unit 61, a display unit 62, and a control unit 63, for example. The network transmission and receiving unit 61 communicates with the position information server 50 via the network 4 according to the standard such as Ethernet. The display unit 62 is a display unit that displays information to the user. The display unit 62 displays the position information of the mobile station 20 with the position information overlapping map information, for example. The control unit 63 is a control unit that controls each of the units in the terminal apparatus 60. The control unit 63 performs control to acquire the position information and the map information of the mobile station 20, which have been calculated by the position information server 50, from the position information server 50 and display the position information and the map information on the display unit 62.

FIG. 5 illustrates an operation example of the mobile station 20 according to the present embodiment. As illustrated in FIG. 5, the mobile station 20 receives a beacon signal bs1 (S101). The plurality of beacon transmitters 10 respectively periodically transmit beacon signals bs1. The beacon receiving unit 21 in the mobile station 20 receives the beacon signals bs1, respectively, from the plurality of beacon transmitters 10. Each of the beacon signals bs1 to be received includes ID information for identifying the beacon transmitter 10 as a transmission source.

Then, the mobile station 20 measures a received signal strength indicator of the beacon signal bs1 (S102). The beacon receiving unit 21 measures the received signal strength indicator of the beacon signal bs1 received from the beacon transmitter 10. The beacon receiving unit 21 measures, when it receives the plurality of beacon signals bs1, the received signal strength indicator of the beacon signal bs1 for each receiving, and acquires the ID information included in the beacon signal bs1.

Then, the mobile station 20 specifies the beacon signal bs1 having the highest received signal strength indicator (S103). In this example, a position of the mobile station 20 is estimated based on a position of the beacon transmitter 10 closest to the mobile station 20. Accordingly, the control unit 24 compares the respective received signal strength indicators of the plurality of beacon signals bs1 received in a predetermined period, and specifies the beacon signal bs1 having the highest received signal strength indicator.

Figures 6, 7:
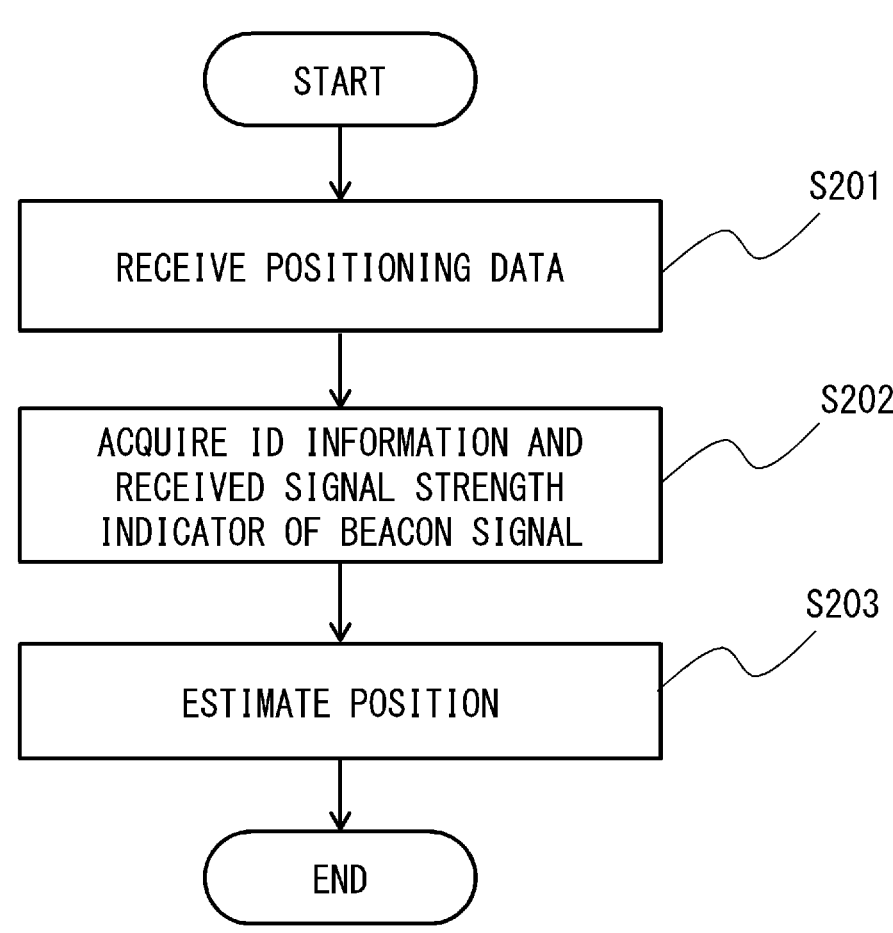
FIG. 6 is a diagram illustrating an example of a transmission selection table in the mobile station according to the first embodiment.
FIG. 7 is a flowchart illustrating an operation example of the position information server according to the first embodiment.

Then, the mobile station 20 determines transmission means based on the beacon signal bs1 (S104). FIG. 6 illustrates an example of a transmission selection table stored in the storage unit 25 for selecting transmission means for transmitting positioning data and a transmission destination. As illustrated in FIG. 6, in the transmission selection table, respective pieces of identification information of transmission means for transmitting positioning data based on a beacon signal bs1 and a transmission destination are associated for each ID information (UUID) of a beacon signal bs1. The control unit 24 searches for the ID information of the received and specified beacon signal bs1 from the transmission selection table in the storage unit 25, and selects the transmission means and the transmission destination associated with the ID information.

If the transmission means is BLE (S104/BLE), the mobile station 20 generates a beacon frame (S105), and transmits a beacon signal bs2 (S106). The control unit 24 determines, if the ID information of the received and specified beacon signal bs1 is "00010001", for example, that the transmission means is the BLE and the transmission destination is a BLE gateway, and generates a beacon frame for a beacon signal according to a BLE standard. For example, positioning data including ID information and a received signal strength indicator of the received beacon signal bs1 is set to a payload of the beacon frame, ID information for identifying the BLE gateway 30 is set to a transmission destination of the beacon frame, and ID information for identifying the mobile station 20 is set to a transmission source (UUID) of the beacon frame. The beacon transmission unit 22 wirelessly transmits the generated beacon frame as a beacon signal bs2 using a BLE signal according to the BLE standard.

If the transmission means is RF (S104/RF), the mobile station 20 generates a data frame (S107), and transmits an RF signal rs (S108). The control unit 24 determines, if the ID information of the received and specified beacon signal bs1 is "00010002", for example, that the transmission means is the RF and the transmission destination is a base station, and generates a data frame for data communication according to a business radio standard. For example, positioning data including ID information and a received signal strength indicator of the received beacon signal bs1 is set to a payload of the data frame, ID information for identifying the base station 40 is set to a transmission destination of the data frame, and ID information for identifying the mobile station 20 is set to a transmission source of the data frame. The RF transmission and receiving unit 23 wirelessly transmits the generated data frame using an RF signal rs according to the business radio standard.

FIG. 7 illustrates an operation example of the position information server 50 according to the present embodiment. As illustrated in FIG. 7, the position information server 50 first receives positioning data (S201). The serial transmission and receiving unit 51 or the serial transmission and receiving unit 52 receives positioning data transmitted from the mobile station 20. If the positioning data is transmitted from the mobile station 20 using a beacon signal bs2, the serial transmission and receiving unit 51 receives positioning data included in the beacon signal bs2 via the BLE gateway 30. If the positioning data is transmitted from the mobile station 20 using an RF signal rs, the serial transmission and receiving unit 52 receives positioning data included in the RF signal rs via the base station 40.

Then, the position information server 50 acquires ID information and a received signal strength indicator of a beacon signal bs1 (S202). The control unit 55 acquires ID information for identifying the beacon transmitter 10 that has transmitted the beacon signal bs1 and a received signal strength indicator of the beacon signal bs1 measured by the mobile station 20 based on the positioning data received from the BLE gateway 30 or the base station 40. As a result, the control unit 55 acquires ID information and a received signal strength indicator of the beacon signal bs1 having the highest received signal strength indicator.

Then, the position information server 50 estimates a position of the mobile station 20 (S203). For example, the control unit 55 may specify, from ID information of the acquired beacon signal bs1, a position of the beacon transmitter 10 to be identified by the ID information and estimate that the position of the mobile station 20 is included in an area around the specified position of the beacon transmitter 10. The control unit 55 may calculate a distance between the beacon transmitter 10 and the mobile station 20 depending on a received signal strength indicator of the beacon signal bs1 and estimate that the position of the mobile station 20 is included in an area to be specified by the distance calculated with the beacon transmitter 10 as a center.

For example, some pieces of information are incorporated into an iBeacon signal as one of beacon signals, and a parameter referred to as Measured Power is included thereamong. In the case of iBeacon, a received signal strength indicator measured by spacing a transmitter and a receiver one meter apart from each other is defined as Measured Power, and a received signal strength indicator as a reference is "RSSI@1 m". Therefore, a distance (d) between the transmitter and the receiver can be calculated by the following equation from the received signal strength indicator as a reference and a received signal strength indicator actually measured. For example, the control unit 55 calculates the distance between the beacon transmitter 10 and the mobile station 20 from the received signal strength indicator of the beacon signal bs1 by the following equation (1).

$$d=10^{\{(RSSI@1\ m-RSSI)/(10*n)\}} \tag{1}$$

In this equation (1), n is a propagation loss coefficient. The propagation loss coefficient n is 2 in an ideal environment, and varies depending on a receiving environment of a radio wave.

As described above, according to the present embodiment, in a position estimation system that estimates a position of a mobile station, a beacon signal is transmitted from a beacon transmitter installed indoors or outdoors, and positioning data based on the beacon signal received by the mobile station is transmitted from the mobile station using an RF signal or a BLE signal. For example, transmission is performed using the RF signal in a location where a network is difficult to be laid by the beacon transmitter, and transmission is performed using the BLE signal in a location where the network can be laid by the beacon transmitter. This enables positioning data to be acquired from the mobile station in any location, thereby making it possible to more reliably estimate a position. Particularly, the beacon transmitter is installed in a location where a GPS signal is difficult to be received, thereby making it possible to reliably manage the position of the mobile station. Transmission is performed using the BLE signal, thereby making it possible to also save an RF channel.

Second Embodiment

A second embodiment will be described below with reference to the drawings. In the present embodiment, transmission means in a mobile station is made selectable from a beacon transmitter. A configuration of each of apparatuses in a position estimation system and an operation of each of the apparatuses other than the beacon transmitter are similar to those in the first embodiment.

Figure 8:
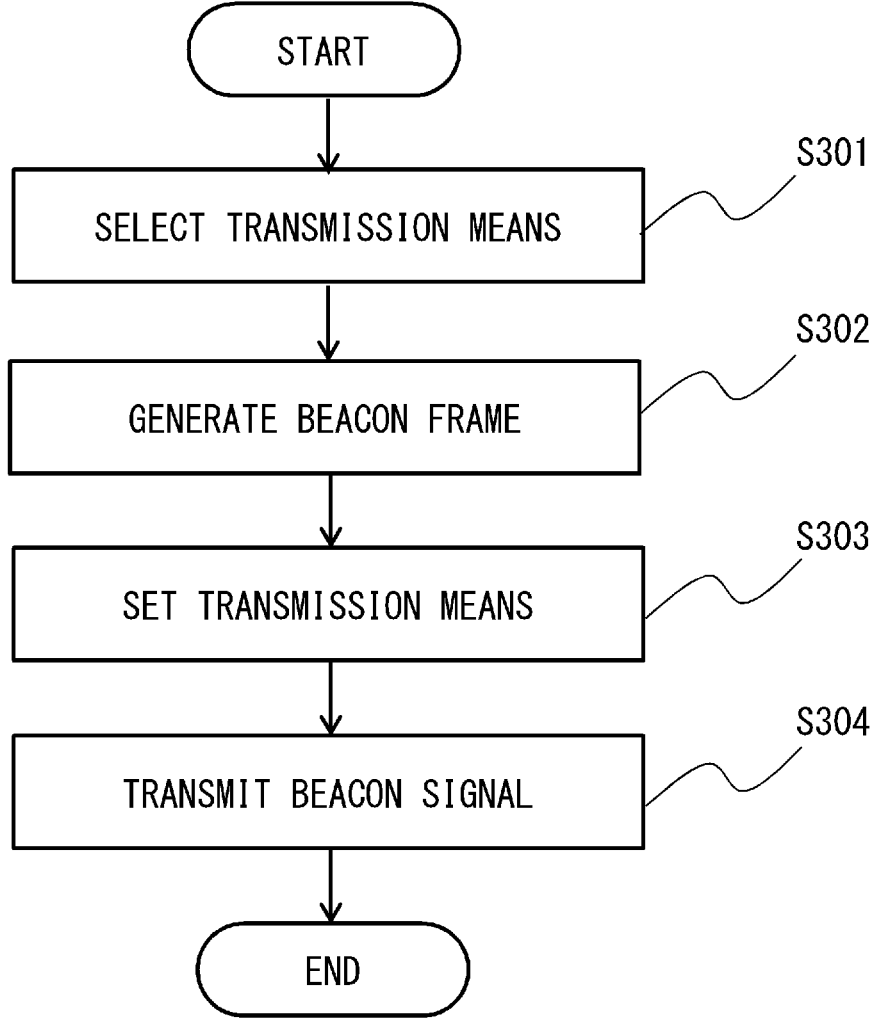
FIG. 8 is a flowchart illustrating an operation example of a beacon transmitter according to a second embodiment.

FIG. 8 illustrates an operation example of a beacon transmitter 10 according to the present embodiment. As illustrated in FIG. 8, the beacon transmitter 10 selects transmission means in a mobile station 20 (S301). A control unit 12 selects transmission means (e.g., BLE or RF) for the mobile station 20 to transmit positioning data based on a beacon signal bs1. For example, the transmission means may be selected from information previously set in a storage unit 13. The transmission means may be selected depending on a position of the beacon transmitter 10. For example, the beacon transmitter 10 may include a GPS receiver, and it may be determined whether the beacon transmitter 10 is located indoors or outdoors from a position to be detected by the GPS receiver, to select BLE and RF, respectively, when the beacon transmitter 10 is located indoors and outdoors.

Then, the beacon transmitter 10 generates a beacon frame (S302), and sets the transmission means in the mobile station 20 (S303). A control unit 12 generates a beacon frame according to a BLE standard. For example, the control unit 12 sets selection information representing the selected transmission means, sets broadcast information to a transmission destination of the beacon frame, and sets ID information for identifying the beacon transmitter 10 to a transmission source (UUID) of the beacon frame.

Then, the beacon transmitter 10 transmits the beacon signal bs1 (S304). The beacon transmission unit 11 wirelessly transmits the generated beacon frame as the beacon signal bs1 using a BLE signal according to the BLE standard. Therefore, the mobile station 20 selects the transmission means depending on selection information included in the received beacon signal bs1, and transmits the positioning data based on the beacon signal bs1 using the selected transmission means.

Thus, the beacon transmitter may transmit the beacon signal bs1 including the selection information for selecting the transmission means in the mobile station and select the transmission means depending on the selection information included in the beacon signal bs1 to be received by the mobile station. In this case, a transmission selection table is not required in a storage unit in the mobile station, and may not be previously set in the mobile station. Like the transmission means, a transmission destination (e.g., a BLE gateway or a base station) may be selected by the beacon transmitter 10. Information about the selected transmission destination may be transmitted with the information included in the beacon signal bs1. As a result, the mobile station 20 can select the transmission destination depending on the information included in the received beacon signal bs1.

The present invention is not limited to the above-described embodiments, but can be appropriately changed without departing from the scope of the invention. Although an example in which a mobile station includes two transmission means has been described in the above-described embodiments, for example, the mobile station may include not only two but also three or more transmission means. For example, the transmission means for transmitting positioning data may be selected from among the three or more transmission means respectively having different communicable distances.

Although an example in which the mobile station transmits positioning data using either one of two transmission means has been described in the above-described embodiments, respective pieces of positioning data may be transmitted by both the two transmission means. In this case, the position information server 50 may select either one of respective pieces of positioning data to be received from two paths and estimate a position using the selected positioning data.

Further, although a position of the mobile station has been estimated based on a beacon signal having the highest received signal strength indicator in the above-described embodiments, any one of a plurality of received beacon signals may be used. For example, a position may be estimated using the beacon signal last received in a predetermined period. The position may be estimated using not only one beacon signal but also a plurality of beacon signals.

Each of components in the above-described embodiments may be configured by either one or both of hardware and software, configured by one hardware or software, or configured by a plurality of pieces of hardware or software. A function (processing) of each of apparatuses may be implemented by a computer having a CPU, a memory, or the like. For example, programs for performing a method (a control method or a position estimation method) in the embodiments may be stored in a storage apparatus, and each of the functions may be implemented by executing the programs stored in the storage apparatus by the CPU.

The programs can be stored using various types of non-transitory computer-readable media and supplied to a computer. The non-transitory computer-readable media include various types of tangible storage media. Examples of the non-transitory computer-readable medium include a magnetic recording medium (e.g., a flexible disk, a magnetic tape, or a hard disk drive), a magneto-optical recording medium (e.g., a magneto-optical disk), a CD-ROM (read only memory), a CD-R, a CD-R/W, a semiconductor memory (e.g., a mask ROM, a PROM (programmable ROM), an EPROM (erasable PROM), a flash ROM, and a RAM (random access memory)). The programs may be supplied to the computer by various types of transitory computer-readable media. Examples of the transitory computer-readable medium include an electric signal, an optical signal, and an electromagnetic wave. The transitory computer-readable medium can supply the programs to the computer via a wired communication path such as an electrical wire or an optical fiber or a wireless communication path.

According to the present embodiment, there can be provided a position estimation system and a mobile station capable of more reliably estimating a position.

The present invention can be appropriately applied to a position estimation system that estimates a position of electronic equipment.

What is claimed is:

1. A position estimation system comprising:
   a beacon transmitter that transmits a beacon signal including specific ID information;
   a mobile station that receives the beacon signal (bs1) from the beacon transmitter and transmits positioning data including the ID information of the beacon transmitter included in the received beacon signal (bs1) and information on a received signal strength of the received beacon signal (bs1); and
   a position estimation apparatus that estimates a position of the mobile station based on the ID information of the beacon transmitter included in the beacon signal (bs1) received by the mobile station and the information on the received signal strength of the beacon signal (bs1) received by the mobile station, which is included in the positioning data transmitted from the mobile station, wherein
   the mobile station comprises;

a beacon receiving unit that receives a beacon signal, a first transmission unit that performs wireless communication using a first communication system, a second transmission unit that performs wireless communication using a second communication system having a shorter communicable distance than that of the first communication system, a storage unit that stores a transmission selection table in which the ID information of the beacon transmitter is associated with information on a transmission means and a transmission destination, and a control unit that generates the positioning data based on the beacon signal (bs1) received by the beacon receiving unit so as to include the ID information of the beacon transmitter included in the received beacon signal (bs1) and the information on the received signal strength of the received beacon signal (bs1), and performs control as to which of the first transmission unit and the second transmission unit transmits the generated positioning data, and the control unit of the mobile station performs control to determine, based on the ID information included in the received beacon signal (bs1), whether a transmission source of the beacon signal (bs1) and the transmission selection table is an outdoor beacon transmitter or an indoor beacon transmitter, transmit the positioning data from the first transmission unit when it is determined that the transmission source of the received beacon signal (bs1) is the outdoor beacon transmitter, and transmit the positioning data from the second transmission unit when it is determined that the transmission source of the received beacon signal (bs1) is the indoor beacon transmitter.

2. The position estimation system according to claim 1, further comprising a first receiving apparatus connected to the position estimation apparatus and capable of performing wireless communication using the first communication system and a second receiving apparatus connected to the position estimation apparatus and capable of performing wireless communication using the second communication system, wherein the mobile station switches, based on the ID information included in the received beacon signal (bs1) and the transmission selection table, a transmission destination of the positioning data to the first receiving apparatus when it is determined that the transmission source of the received beacon signal (bs1) is the outdoor beacon transmitter and switches the transmission destination of the positioning data to the second receiving apparatus when it is determined that the transmission source of the received beacon signal (bs1) is the indoor beacon transmitter.

3. A mobile station comprising:

a beacon receiving unit that receives a beacon signal (bs1);

a first transmission unit that performs wireless communication using a first communication system;

a second transmission unit that performs wireless communication using a second communication system having a shorter communicable distance than that of the first communication system;

a storage unit that stores a transmission selection table in which ID information of a beacon transmitter is associated with information on a transmission means and a transmission destination, and a control unit that generates positioning data based on the beacon signal (bs1) received by the beacon receiving unit so as to include the ID information of the beacon transmitter included in the received beacon signal (bs1) and information on a received signal strength of the received beacon signal (bs1), and performs control as to which of the first transmission unit and the second transmission unit transmits the generated positioning data, wherein the control unit performs control to determine, based on the ID information included in the received beacon signal (bs1) and the transmission selection table, whether a transmission source of the beacon signal is an outdoor beacon transmitter or an indoor beacon transmitter, transmit the positioning data from the first transmission unit when it is determined that the transmission source of the received beacon signal (bs1) is the outdoor beacon transmitter, and transmit the positioning data from the second transmission unit when it is determined that the transmission source of the received beacon signal (bs1) is the indoor beacon transmitter.

\* \* \* \* \*